United States Patent
Tseng et al.

(10) Patent No.: US 10,153,721 B2
(45) Date of Patent: Dec. 11, 2018

(54) ELECTRONICALLY COMMUTATED FAN SYSTEM

(71) Applicant: DELTA ELECTRONICS, INC., Taoyuan (TW)

(72) Inventors: Wei-Shuo Tseng, Taoyuan (TW); Chao-Chin Chuang, Taoyuan (TW); Yao-Yang Yu, Taoyuan (TW); Li-Wei Hsiao, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/370,345

(22) Filed: Dec. 6, 2016

(65) Prior Publication Data

US 2018/0138853 A1    May 17, 2018

(30) Foreign Application Priority Data

Nov. 17, 2016  (CN) .......................... 2016 1 1013201

(51) Int. Cl.
*H02P 29/10* (2016.01)
*H02P 6/14* (2016.01)
(Continued)

(52) U.S. Cl.
CPC .............. *H02P 29/10* (2016.02); *H02M 1/32* (2013.01); *H02P 6/14* (2013.01); *H02P 6/28* (2016.02);
(Continued)

(58) Field of Classification Search
CPC .............. H02P 29/10; H02P 6/14; H02P 27/06
See application file for complete search history.

(56) References Cited

U.S. PATENT DOCUMENTS 3,815,009 A * 6/1974 Berger ................. H02M 3/337
                                                    307/66
4,027,204 A   5/1977 Norbeck
(Continued)

FOREIGN PATENT DOCUMENTS

KR       20160065618        6/2016

OTHER PUBLICATIONS

European Search Report dated Jul. 20, 2017 from corresponding application No. EP16204487.9.
(Continued)

*Primary Examiner* — Muhammad S Islam
(74) *Attorney, Agent, or Firm* — Hauptman Ham, LLP

(57) ABSTRACT

An electronically commutated fan system includes an alternating-current-to-direct-current conversion unit, an inverter unit and a control unit. The alternating-current-to-direct-current conversion unit converts an alternating-current input power source into a first direct-current power source. The inverter unit is electrically connected between the alternating-current-to-direct-current conversion unit and a fan. The inverter unit converts the first direct-current power source into an alternating-current output power source and provides the alternating-current output power source to the fan to rotate. The control unit is electrically connected to the alternating-current-to-direct-current conversion unit and the inverter unit. The control unit controls the alternating-current-to-direct-current conversion unit and the inverter unit to adjust a rotational speed of the fan. When the control unit detects a power variation of the alternating-current input power source, the control unit controls the rotational speed of the fan to be maintained within a first error range.

14 Claims, 9 Drawing Sheets

(51) Int. Cl.
*H02P 27/06* (2006.01)
*H02M 1/32* (2007.01)
*H02P 6/28* (2016.01)
*H02M 1/42* (2007.01)
*H02M 1/00* (2006.01)

(52) U.S. Cl.
CPC ........... *H02P 27/06* (2013.01); *H02M 1/4225* (2013.01); *H02M 2001/0022* (2013.01); *H02M 2001/325* (2013.01); *H02M 2001/4291* (2013.01); *H02P 2201/07* (2013.01)

(56) References Cited

U.S. PATENT DOCUMENTS

| | | | |
|---|---|---|---|
| 7,502,233 B2 | 3/2009 | Kim et al. | |
| 2009/0167086 A1* | 7/2009 | Seymour | H02J 1/08 307/33 |
| 2011/0095711 A1* | 4/2011 | Hsieh | H02M 1/4208 318/116 |
| 2011/0238338 A1* | 9/2011 | Iwashita | H02P 29/025 702/58 |
| 2013/0342149 A1* | 12/2013 | Masuda | H02P 3/02 318/479 |
| 2014/0139164 A1 | 5/2014 | Koo | |
| 2014/0268953 A1 | 9/2014 | Patel et al. | |
| 2016/0268950 A1 | 9/2016 | Cho et al. | |
| 2016/0322907 A1* | 11/2016 | Hwang | H02M 1/36 |
| 2018/0034403 A1 | 2/2018 | Kim et al. | |

OTHER PUBLICATIONS

European Search Report dated Feb. 9, 2018 from corresponding application No. EP17199088.0.

* cited by examiner

ELECTRONICALLY COMMUTATED FAN SYSTEM

BACKGROUND OF THE INVENTION

Field of the Invention

The present invention relates to an electronically commutated fan system, and especially relates to an electronically commutated fan system with a wide input voltage range of a three-phase and single-phase power source compatible application.

Description of the Related Art

Comparing with the conventional alternating-current fan (AC Fan), the electronically commutated fan (EC Fan) has the advantages of high efficiency, controllable rotational speed, applicable communication interfaces and multiple protection mechanisms. According to the basic principles of the motor, the rotational speed of the motor is dependent upon the input power source. Therefore, when the alternating-current input power source changes, the duty cycle is adjusted by the electronically commutated fan to maintain the stabilization of the rotational speed of the motor. However, if the variation of the alternating-current input power source is too large (for example, the voltage variation is over 100 volts) thus exceeding the range of steadily adjusting the rotational speed by adjusting the duty cycle, the rotational speed of the motor is still changed due to the variation of the alternating-current input power source, so that the rotational speed predetermined by the system cannot be achieved. Moreover, the voltage of the motor is deviated from the voltage of the original motor design which has the peak efficiency due to the variation of the alternating-current input power source, so that the efficiency of the motor is decreasing.

FIG. 1A shows a Y connection diagram of the related art motor. FIG. 1B shows a triangle (Δ) connection diagram of the related art motor. The related art three-phase electronically commutated fan has to have the differentiated design according to different alternating-current input power source due to the reasons mentioned above. Usually there are two methods: different motor winding design according to different voltage, or changing to different connection for the same motor. When the alternating-current input voltage is 3ψ220V, the triangle (Δ) connection shown in FIG. 1B is adopted. When the alternating-current input voltage is 3ψ380V, the Y connection shown in FIG. 1A is adopted. The methods mentioned above have different designs according to different three-phase input voltage (220V or 380V), so that the electronically commutated fan system mentioned above has following disadvantages:

1. A single three-phase electronically commutated fan system which is applicable to the voltage range of the wide input power source cannot be achieved. The related art electronically commutated fan has different motor winding design according to different voltage, or changes to different connection for the same motor, so that the three-phase electronically commutated fan with the wide input power source cannot be achieved.

2. The rotational speed of the electronically commutated fan system cannot achieve the predetermined rotational speed required by the cooling system. If the same fan is applied to the three-phase or single-phase power source, because the variation of the alternating-current input power source is too large thus exceeding the range of steadily adjusting the rotational speed by adjusting the duty cycle, the predetermined rotational speed cannot be achieved, so that the efficiency of the motor is decreasing.

3. The three-phase and single-phase power source compatible application cannot be provided. The related art electronically commutated fan does not have the three-phase and single-phase power source compatible application, so that the design of the cooling system or module lacks of the flexibility for the application of the power source.

Therefore, the inventors of the present invention would like to solve the problems mentioned above and would like to design an electronically commutated fan system which has the wide alternating-current input power source range, and which can maintain the stabilization of the rotational speed of the fan, and which can provide the three-phase and single-phase input compatible application.

SUMMARY OF THE INVENTION

In order to solve the above-mentioned problems, the present invention provides an electronically commutated fan system to overcome the problems of the related art. Therefore, the electronically commutated fan system of the present invention includes an alternating-current-to-direct-current conversion unit, an inverter unit and a control unit. The alternating-current-to-direct-current conversion unit receives an alternating-current input power source and converts the alternating-current input power source into a first direct-current power source. The inverter unit is electrically connected between the alternating-current-to-direct-current conversion unit and a fan. The inverter unit converts the first direct-current power source into an alternating-current output power source and provides the alternating-current output power source to the fan to rotate. The control unit is electrically connected to the alternating-current-to-direct-current conversion unit and the inverter unit. The control unit controls the alternating-current-to-direct-current conversion unit and the inverter unit to adjust a rotational speed of the fan. Moreover, when the control unit detects a power variation of the alternating-current input power source, the control unit controls the rotational speed of the fan to be maintained within a first error range.

In an embodiment, the electronically commutated fan system further comprises a bus capacitor electrically connected between the alternating-current-to-direct-current conversion unit and the inverter unit. The bus capacitor stores and stabilizes the first direct-current power source. Moreover, a voltage crossing the bus capacitor is the first direct-current power source. When the control unit detects the power variation of the alternating-current input power source, the first direct-current power source outputted from the alternating-current-to-direct-current conversion unit is controlled and maintained within a second error range, so that the rotational speed of the fan is maintained within the first error range.

In an embodiment, a range of the power variation of the alternating-current input power source is between 220 volts and 480 volts. When the range of the power variation of the alternating-current input power source is between 220 volts and 480 volts, the best is that the second error range is 97%~103% of the first direct-current power source and the first error range is 97%~103% of the rotational speed of the fan. Namely, when the range of the power variation of the alternating-current input power source is between 220 volts and 480 volts, the second error range is the best that an upper limitation of the second error range is the first direct-current power source plus 3% of the first direct-current power source and a lower limitation of the second error range is the first direct-current power source minus 3% of the first direct-current power source. When the range of the power variation of the alternating-current input power source is between 220 volts and 480 volts, the first error range is the best that an upper limitation of the first error range is the rotational speed of the fan plus 3% of the rotational speed of the fan and a lower limitation of the first error range is the rotational speed of the fan minus 3% of the rotational speed of the fan.

In an embodiment, the alternating-current input power source is a three-phase alternating-current power source or a single-phase alternating-current power source.

In an embodiment, the electronically commutated fan system further comprises a phase predetermination unit electrically connected to the control unit. Moreover, the phase predetermination unit predetermines (namely, pre-sets or expects) that the alternating-current input power source is the three-phase alternating-current power source, and when the control unit detects that the alternating-current input power source is single-phase, an alarm signal is generated by the control unit.

In an embodiment, the phase predetermination unit is mechanical-connection-predetermining or electrical- signal-difference-predetermining.

In an embodiment, the alternating-current-to-direct-current conversion unit is an active type power factor corrector.

In an embodiment, the alternating-current-to-direct-current conversion unit comprises a rectifying unit and a conversion unit. The rectifying unit receives the alternating-current input power source and rectifies the alternating-current input power source to obtain a second direct-current power source. The conversion unit is electrically connected between the rectifying unit and the inverter unit. The conversion unit converts the second direct-current power source into the first direct-current power source.

In an embodiment, the conversion unit is a boost converter. The conversion unit comprises an inductor, a switch unit and a diode. One side of the inductor is electrically connected to the rectifying unit. The other side of the inductor is connected to one side of the switch unit and an anode of the diode. A cathode of the diode is connected to one side of the bus capacitor. The control unit controls an on-off status of the switch unit to stabilize the first direct-current power source of the bus capacitor.

In an embodiment, the conversion unit is a buck converter. The conversion unit comprises an inductor, a switch unit and a diode. One side of the switch unit is electrically connected to the rectifying unit. The other side of the switch unit is connected to one side of the inductor and a cathode of the diode. The other side of the inductor is connected to one side of the bus capacitor. The control unit controls an on-off status of the switch unit to stabilize the first direct-current power source of the bus capacitor.

In an embodiment, the alternating-current-to-direct-current conversion unit comprises an inductor group, a rectifying unit, a switch unit and a diode. The inductor group receives the alternating-current input power source. The rectifying unit is electrically connected to the inductor group. The switch unit is connected to the rectifying unit in parallel. The diode is electrically connected between the switch unit and the inverter unit. Moreover, the alternating-current-to-direct-current conversion unit converts the alternating-current input power source into the first direct-current power source.

In an embodiment, if a peak voltage of the alternating-current input power source is lower than a voltage of the first direct-current power source, the alternating-current-to-direct-current conversion unit is a boost alternating-current-to-direct-current converter. If the peak voltage of the alternating-current input power source is higher than the voltage of the first direct-current power source, the alternating-current-to-direct-current conversion unit is a buck alternating-current-to-direct-current converter.

In an embodiment, the control unit comprises a controller. The controller controls the alternating-current-to-direct-current conversion unit and the inverter unit simultaneously (namely, the controller is able to control both the alternating-current-to-direct-current conversion unit and the inverter unit).

In order to solve the above-mentioned problems, the present invention provides an electronically commutated fan system to overcome the problems of the related art. Therefore, the electronically commutated fan system of the present invention includes an alternating-current-to-direct-current conversion unit, an inverter unit and a control unit. The alternating-current-to-direct-current conversion unit receives an alternating-current input power source and converts the alternating-current input power source into a first direct-current power source. The inverter unit is electrically connected between the alternating-current-to-direct-current conversion unit and a fan. The inverter unit converts the first direct-current power source into an alternating-current output power source and provides the alternating-current output power source to the fan to rotate. The control unit comprises two controllers which are electrically connected to the alternating-current-to-direct-current conversion unit and the inverter unit respectively. The two controllers control the alternating-current-to-direct-current conversion unit and the inverter unit respectively to adjust a rotational speed of the fan. Moreover, when the control unit detects a power variation of the alternating-current input power source, the control unit controls the rotational speed of the fan to be maintained within a first error range.

In an embodiment, the electronically commutated fan system further comprises a bus capacitor electrically connected between the alternating-current-to-direct-current conversion unit and the inverter unit. The bus capacitor stores and stabilizes the first direct-current power source. Moreover, a voltage crossing the bus capacitor is the first direct-current power source. When the control unit detects the power variation of the alternating-current input power source, the first direct-current power source outputted from the alternating-current-to-direct-current conversion unit is controlled and maintained within a second error range, so that the rotational speed of the fan is maintained within the first error range.

In an embodiment, a range of the power variation of the alternating-current input power source is between 220 volts and 480 volts. When the range of the power variation of the alternating-current input power source is between 220 volts and 480 volts, the best is that the second error range is 97%~103% of the first direct-current power source and the first error range is 97%~103% of the rotational speed of the fan. Namely, when the range of the power variation of the alternating-current input power source is between 220 volts and 480 volts, the second error range is the best that an upper limitation of the second error range is the first direct-current power source plus 3% of the first direct-current power source and a lower limitation of the second error range is the first direct-current power source minus 3% of the first direct-current power source. When the range of the power variation of the alternating-current input power source is between 220 volts and 480 volts, the first error range is the best that an upper limitation of the first error range is the rotational speed of the fan plus 3% of the rotational speed of the fan and a lower limitation of the first error range is the rotational speed of the fan minus 3% of the rotational speed of the fan. In another word, when the range of the power variation of the alternating-current input power source is between 220 volts and 480 volts, the second error range is (set as) 97%~103% of the first direct-current power source and the first error range is (set as) 97%~103% of the rotational speed of the fan.

Please refer to the detailed descriptions and figures of the present invention mentioned below for further understanding the technology, method and effect disclosed by the present invention to achieve the predetermined purpose of the present invention. The purpose, features and characteristics of the present invention can be understood well and in details. However, the figures are only for references and descriptions, but the present invention is not limited by the figures.

DETAILED DESCRIPTION OF THE INVENTION

Please refer to following detailed description and figures for the technical content of the present invention.

Figure 2A:
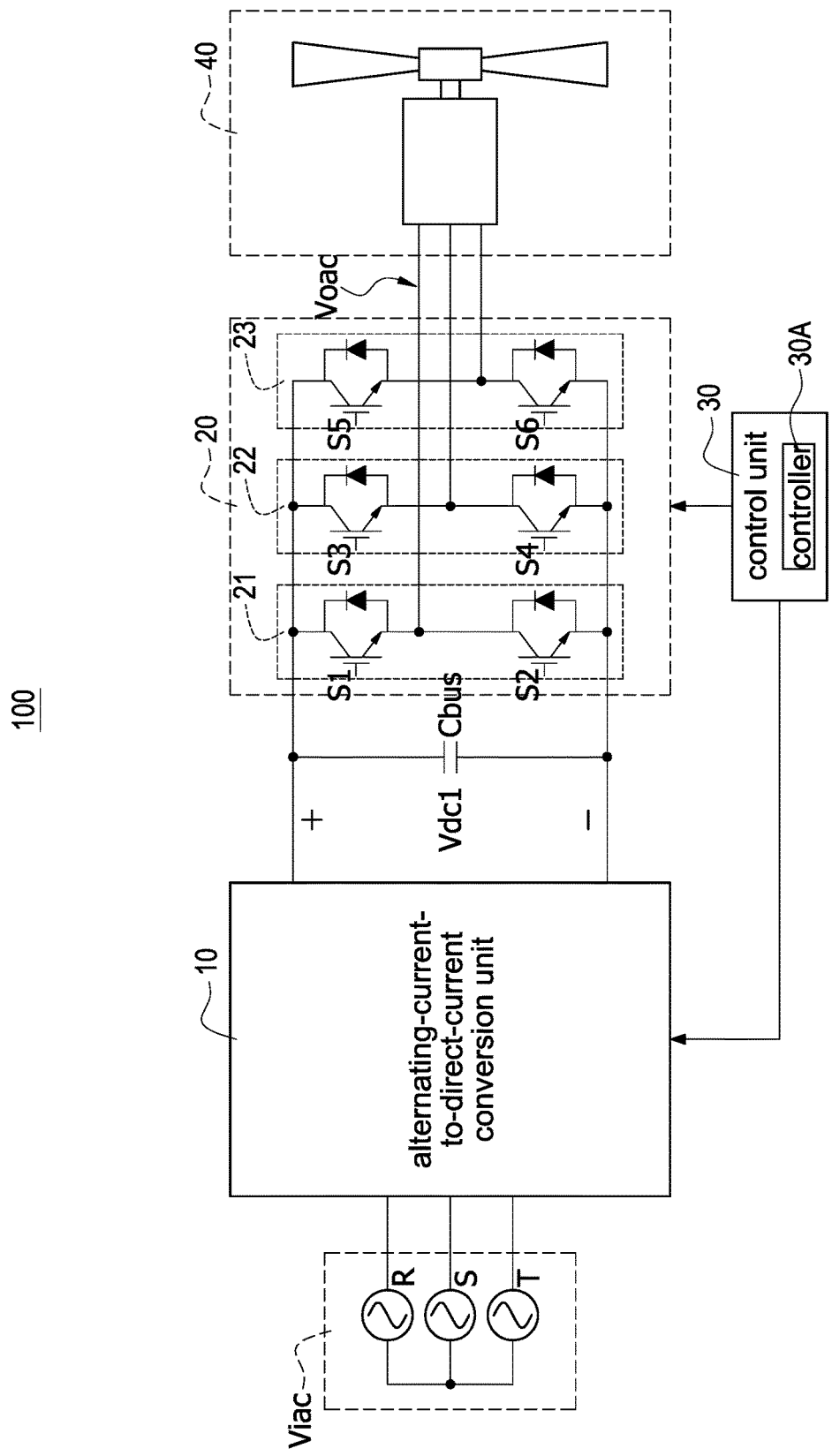
FIG. 2A shows a circuit block diagram of the first embodiment of the electronically commutated fan system of the present invention.
Figure 2B:
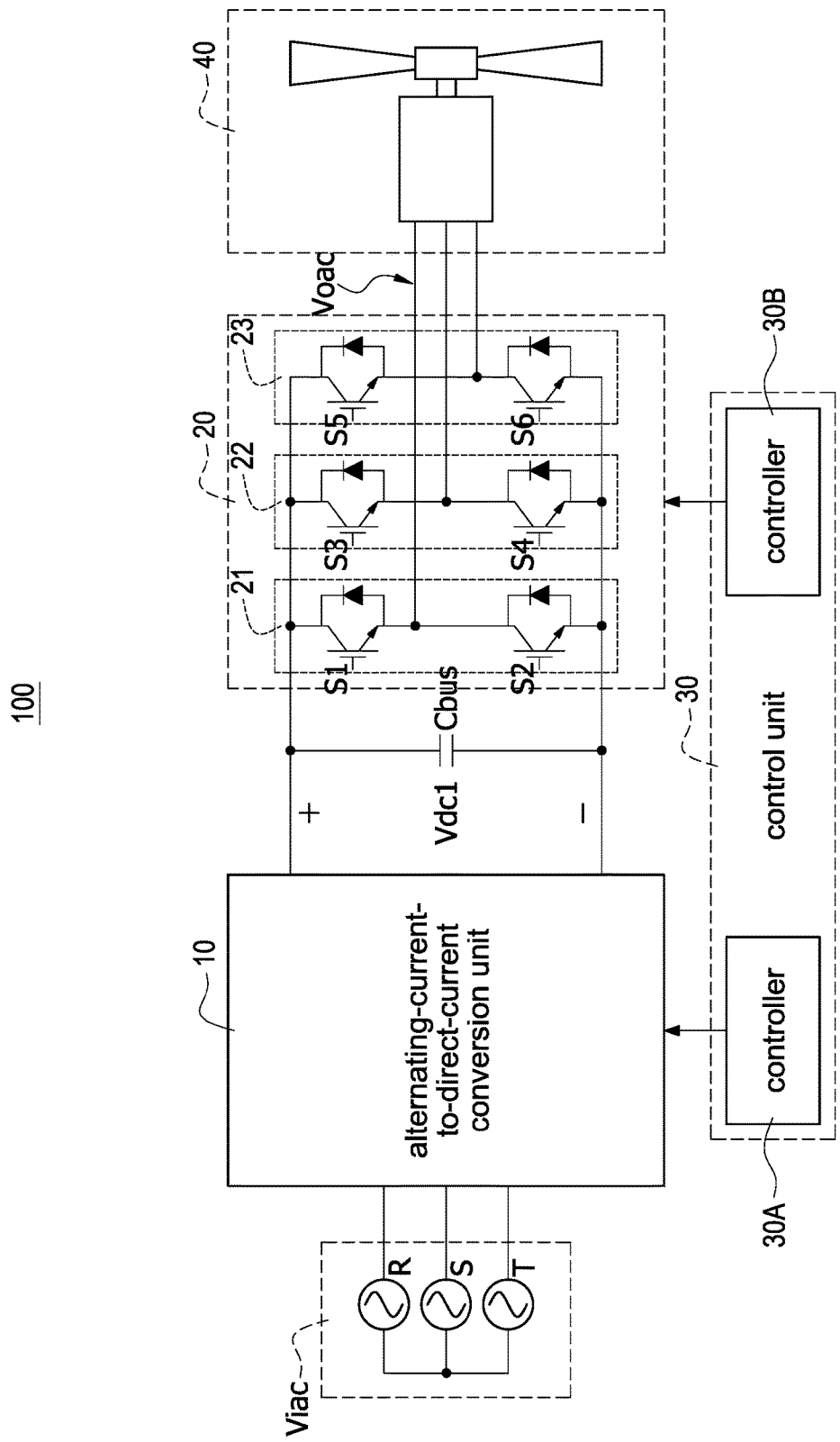
FIG. 2B shows a circuit block diagram of the second embodiment of the electronically commutated fan system of the present invention.

FIG. 2A shows a circuit block diagram of the first embodiment of the electronically commutated fan system of the present invention. An electronically commutated fan system 100 includes an alternating-current-to-direct-current conversion unit 10, an inverter unit 20 and a control unit 30. The alternating-current-to-direct-current conversion unit 10 receives an alternating-current input power source Viac and converts the alternating-current input power source Viac into a first direct-current power source Vdc1. The inverter unit 20 is electrically connected between the alternating-current-to-direct-current conversion unit 10 and a fan 40. The inverter unit 20 converts the first direct-current power source Vdc1 into an alternating-current output power source Voac and provides the alternating-current output power source Voac to the fan 40 to rotate. The control unit 30 is electrically connected to the alternating-current-to-direct-current conversion unit 10 and the inverter unit 20. By detecting feedback signals (not shown in FIG. 2A, for example but not limited, detecting a detected point of the related art or prior art) of the alternating-current-to-direct-current conversion unit 10 and the inverter unit 20, the control unit 30 controls the alternating-current-to-direct-current conversion unit 10 and the inverter unit 20 to adjust a rotational speed of the fan 40. The electronically commutated fan system 100 further comprises a bus capacitor Cbus electrically connected between the alternating-current-to-direct-current conversion unit 10 and the inverter unit 20. The bus capacitor Cbus stores and stabilizes the first direct-current power source Vdc1. Moreover, the alternating-current input power source Viac received by the electronically commutated fan system 100 can be a three-phase alternating-current power source or a single-phase alternating-current power source. A range of a power variation of the alternating-current input power source Viac is between 220 volts and 480 volts. FIG. 2B shows a circuit block diagram of the second embodiment of the electronically commutated fan system of the present invention. In this embodiment and other embodiments, the control unit 30 comprises one controller or a plurality of controllers (namely, a controller 30A and a controller 30B). If the control unit 30 comprises one controller (namely, the controller 30A) as shown in FIG. 2A, the controller 30A controls the alternating-current-to-direct-current conversion unit 10 and the inverter unit 20 at the same time (namely, simultaneously). Namely, the controller 30A controls both the alternating-current-to-direct-current conversion unit 10 and the inverter unit 20. If the control unit 30 comprises a plurality of controllers (namely, the controller 30A and the controller 30B) as shown in FIG. 2B, the controller 30A and the controller 30B are electrically connected to the alternating-current-to-direct-current conversion unit 10 and the inverter unit 20 respectively. The controller 30A and the controller 30B control the alternating-current-to-direct-current conversion unit 10 and the inverter unit 20 respectively.

Figure 1A:
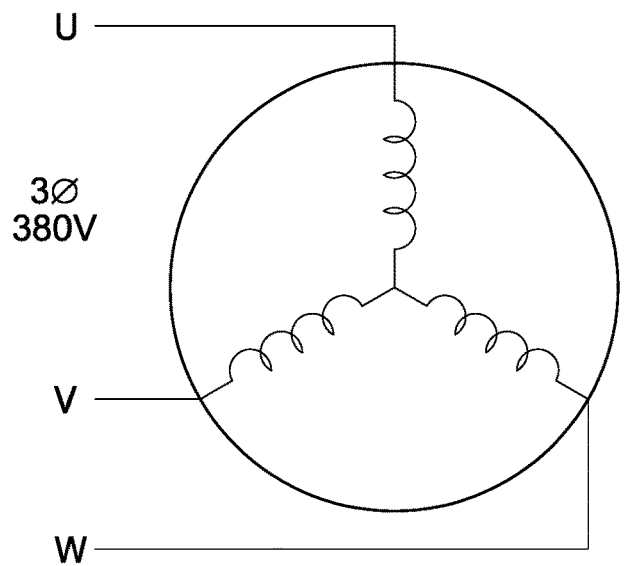
FIG. 1A shows a Y connection diagram of the related art motor.
Figure 1B:
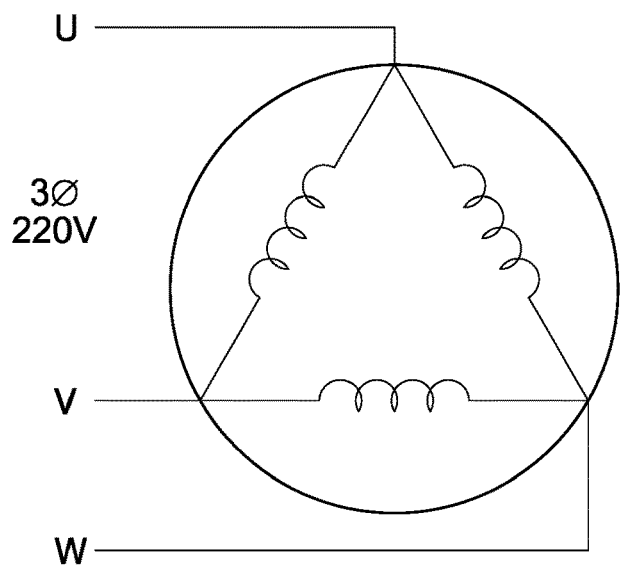
FIG. 1B shows a triangle (Δ) connection diagram of the related art motor.

As shown in FIG. 2A, the inverter unit 20 comprises a first bridge arm 21, a second bridge arm 22 and a third bridge arm 23. The first bridge arm 21 comprises a first upper bridge arm S1 and a first lower bridge arm S2. The first upper bridge arm S1 is connected to the first lower bridge arm S2 in series. One side (namely the side U, as shown in FIG. 1A or FIG. 1B) of the sides of the fan 40 is electrically connected between the first upper bridge arm S1 and the first lower bridge arm S2. The second bridge arm 22 comprises a second upper bridge arm S3 and a second lower bridge arm S4. The second upper bridge arm S3 is connected to the second lower bridge arm S4 in series. One side (namely the side V, as shown in FIG. 1A or FIG. 1B) of the sides of the fan 40 is electrically connected between the second upper bridge arm S3 and the second lower bridge arm S4. The third bridge arm 23 comprises a third upper bridge arm S5 and a third lower bridge arm S6. The third upper bridge arm S5 is connected to the third lower bridge arm S6 in series. One side (namely the side W, as shown in FIG. 1A or FIG. 1B) of the sides of the fan 40 is electrically connected between the third upper bridge arm S5 and the third lower bridge arm S6. The bus capacitor Cbus is connected to the first bridge arm 21, the second bridge arm 22 and the third bridge arm 23 in parallel. The control unit 30 turns on and off the upper bridge arms (S1, S3, S5) and the lower bridge arms (S2, S4, S6) of the inverter unit 20 to convert the first direct-current power source Vdc1 (of the bus capacitor Cbus) into the alternating-current output power source Voac to provide the alternating-current output power source Voac to the fan 40 to rotate. Moreover, the alternating-current output power source Voac is a three-phase alternating-current output power source. The motor of the fan 40 is a permanent-magnet synchronous motor (PMSM).

Figure 3A:
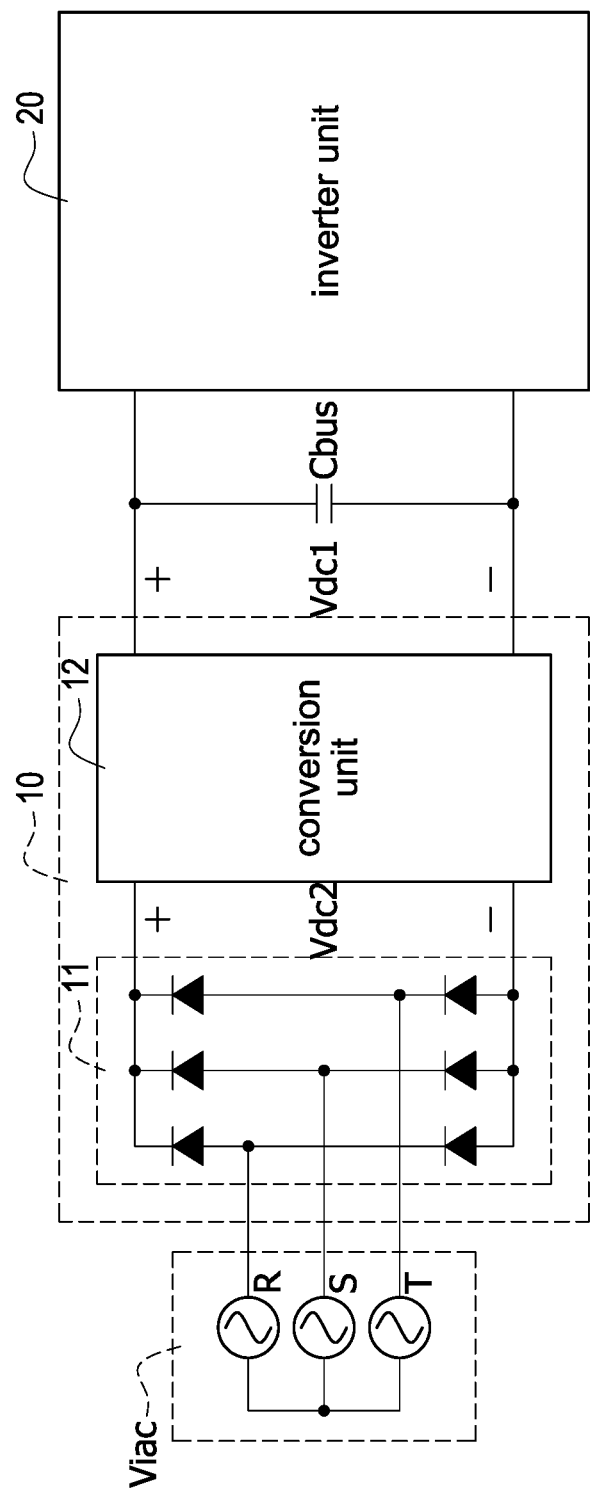
FIG. 3A shows a circuit block diagram of the first embodiment of the alternating-current-to-direct-current conversion unit of the present invention.

FIG. 3A shows a circuit block diagram of the first embodiment of the alternating-current-to-direct-current conversion unit of the present invention. Please refer to FIG. 2A and FIG. 2B again. The alternating-current-to-direct-current conversion unit 10 comprises a rectifying unit 11 and a conversion unit 12. The rectifying unit 11 is a three-phase bridge rectifying circuit and converts the alternating-current input power source Viac into a second direct-current power source Vdc2. The three-phase bridge rectifying circuit comprises three bridge arms, wherein each of the bridge arms comprises two diodes that the anode of the upper diode is connected to the cathode of the lower diode, and a connection point between the anode and the cathode is electrically connected to a power source of one of the phases of the alternating-current input power source Viac. The conversion unit 12 is electrically connected to the rectifying unit 11 and the inverter unit 20. The conversion unit 12 converts the second direct-current power source Vdc2 into the first direct-current power source Vdc1, and the first direct-current power source Vdc1 is stored through the bus capacitor Cbus. Moreover, if a peak voltage of the alternating-current input power source Viac is lower than a voltage of the first direct-current power source Vdc1 of the bus capacitor Cbus, the alternating-current-to-direct-current conversion unit 10 can be a boost alternating-current-to-direct-current converter to stabilize the first direct-current power source Vdc1. If the peak voltage of the alternating-current input power source Viac is higher than the voltage of the first direct-current power source Vdc1 of the bus capacitor Cbus, the alternating-current-to-direct-current conversion unit 10 can be a buck alternating-current-to-direct-current converter to stabilize the first direct-current power source Vdc1.

Figure 3B:
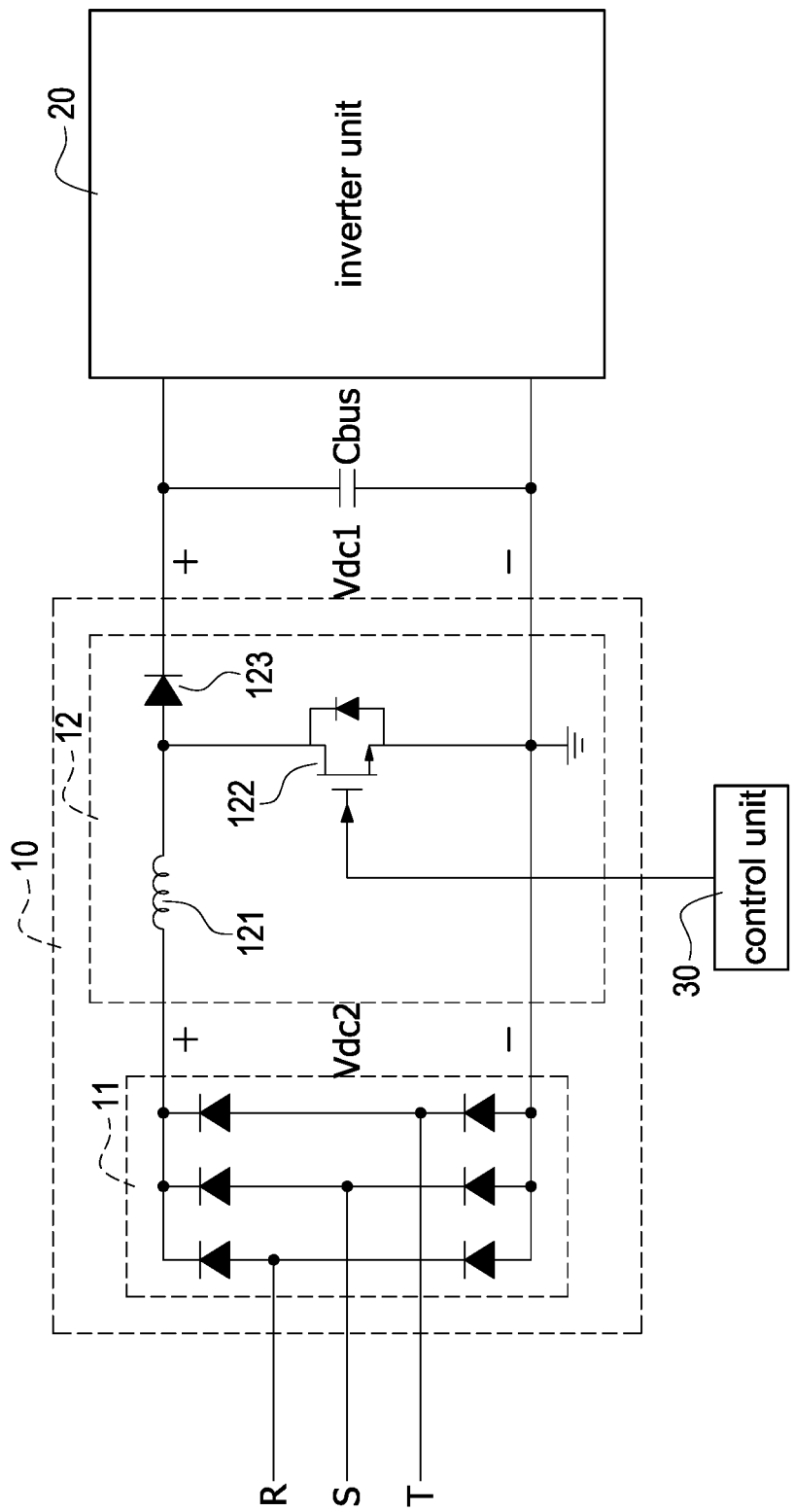
FIG. 3B shows a circuit diagram of the first embodiment of the conversion unit of the present invention.
Figure 3C:
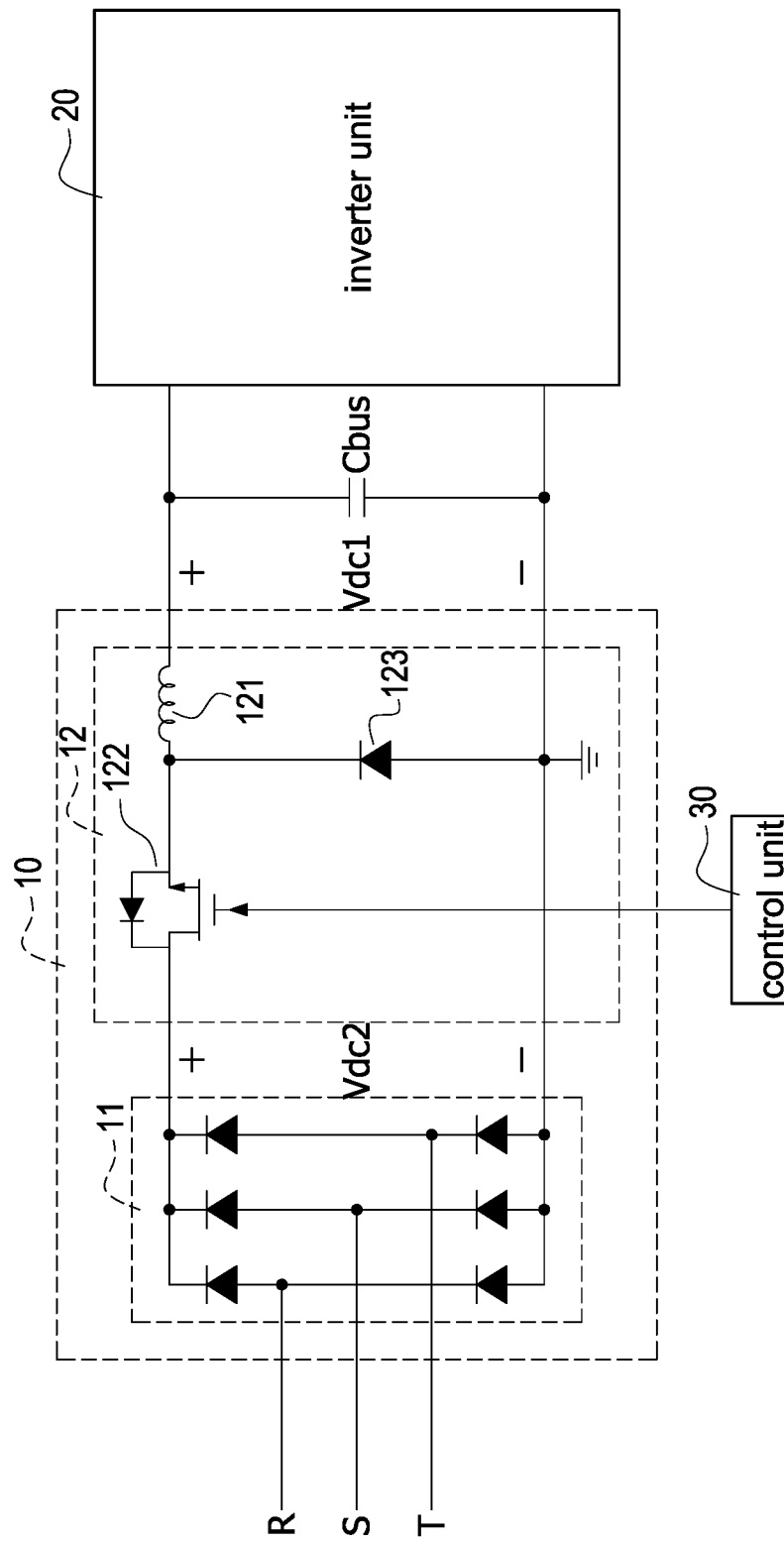
FIG. 3C shows a circuit diagram of the second embodiment of the conversion unit of the present invention.

FIG. 3B shows a circuit diagram of the first embodiment of the conversion unit of the present invention. Please refer to FIGS. 2A~3A again. The conversion unit 12 is a boost converter. The conversion unit 12 comprises an inductor 121, a switch unit 122 and a diode 123. One side of the inductor 121 is electrically connected to the rectifying unit 11. The other side of the inductor 121 is connected to one side of the switch unit 122 and an anode of the diode 123. A cathode of the diode 123 is connected to one side of the bus capacitor Cbus. The control unit 30 controls an on-off status of the switch unit 122 to stabilize the first direct-current power source Vdc1 of the bus capacitor Cbus. FIG. 3C shows a circuit diagram of the second embodiment of the conversion unit of the present invention. Please refer to FIGS. 2A~3A again. The conversion unit 12 is a buck converter. The conversion unit 12 comprises an inductor 121, a switch unit 122 and a diode 123. One side of the switch unit 122 is electrically connected to the rectifying unit 11. The other side of the switch unit 122 is connected to one side of the inductor 121 and a cathode of the diode 123. The other side of the inductor 121 is connected to one side of the bus capacitor Cbus. The control unit 30 controls an on-off status of the switch unit 122 to stabilize the first direct-current power source Vdc1 of the bus capacitor Cbus.

Figure 4:
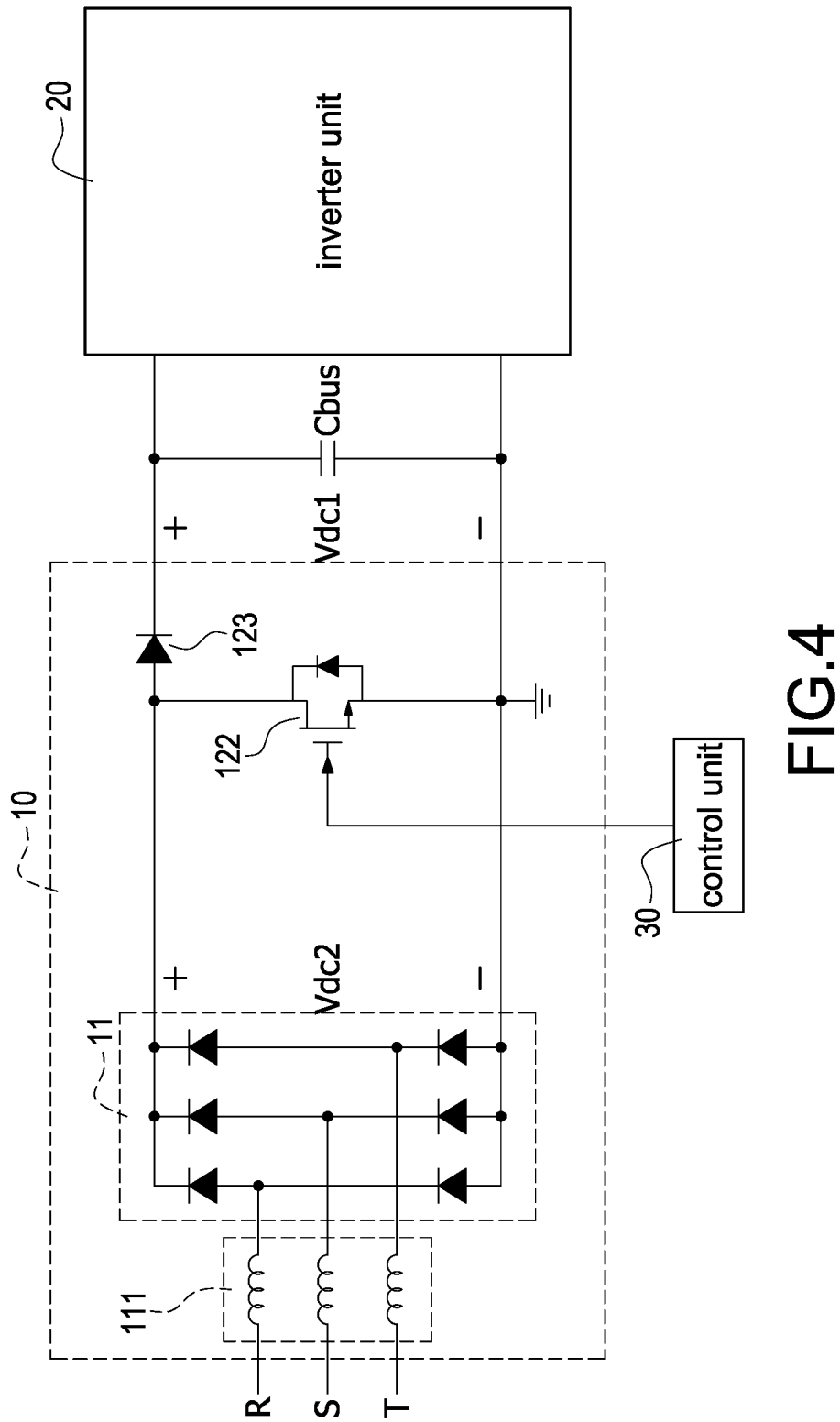
FIG. 4 shows a circuit diagram of the second embodiment of the alternating-current-to-direct-current conversion unit of the present invention.

FIG. 4 shows a circuit diagram of the second embodiment of the alternating-current-to-direct-current conversion unit of the present invention. Please refer to FIGS. 2A~3C again. The alternating-current-to-direct-current conversion unit 10 is a boost alternating-current-to-direct-current converter. The alternating-current-to-direct-current conversion unit 10 comprises an inductor group 111, a rectifying unit 11, a switch unit 122 and a diode 123. The inductor group 111 comprises three boost inductors, and the three boost inductors receive a power source of one of the phases of the three-phase alternating-current input power source Viac respectively (namely, each of the three boost inductors receives a power source of one of the phases of the three-phase alternating-current input power source Viac). The rectifying unit 11 is a three-phase bridge rectifying circuit. The three-phase bridge rectifying circuit comprises three bridge arms, wherein each of the bridge arms comprises two diodes that the anode of the upper diode is connected to the cathode of the lower diode, and a connection point between the anode and the cathode is electrically connected to one of the boost inductors of the inductor group 111. The switch unit 122 is connected to the rectifying unit 11 in parallel. One side of the switch unit 122 is connected to the anode of the diode 123. The cathode of the diode 123 is electrically connected to the inverter unit 20. The control unit 30 controls the on-off status of the switch unit 122 to convert the alternating-current input power source Viac into the first direct-current power source Vdc1, and the first direct-current power source Vdc1 is stored through the bus capacitor Cbus (namely, the bus capacitor Cbus stores the first direct-current power source Vdc1).

Please refer to FIG. 2A again and please refer to FIGS. 3A~4. The alternating-current-to-direct-current conversion unit 10 is an active type power factor corrector (hereinafter, or an active type power factor convertor). The active type power factor corrector can adjust the input current of the load to improve the power factor of the power electronic system. The main purpose of the active type power factor corrector is to make the input current approach the current of the pure resistive load. In the ideal status, its voltage phase is the same with its current phase, and the reactive power generated or consumed by it is zero, so that the power output side can transmit the energy to the load with the highest efficiency. In the status that the input current and voltage have the same phase and the frequency is the same, the active type power factor corrector will try to maintain its output as a constant direct-current voltage. Therefore, the active type power factor corrector can convert the alternating-current input power source Viac into the first direct-current power source Vdc1, and can stabilize the first direct-current power source Vdc1, so that the voltage value of the first direct-current power source Vdc1 is not influenced by the variation of the alternating-current input power source Viac. When the control unit 30 detects the power variation of the alternating-current input power source Viac, the control unit 30 adjusts the duty cycle of the switch unit 122 inside the alternating-current-to-direct-current conversion unit 10 to maintain the first direct-current power source Vdc1 outputted by the alternating-current-to-direct-current conversion unit 10 within a second error range Re2. Moreover, the first direct-current power source Vdc1 is always maintained within the second error range Re2, so that the control unit 30 can control and maintain the rotational speed of the fan 40 within a first error range Re1. As shown in FIGS. 2A~3C, when the alternating-current input power source Viac is between 220 volts and 480 volts, the alternating-current-to-direct-current conversion unit 10 maintains the voltage value of the first direct-current power source Vdc1 within the second error range Re2. The best is that the second error range Re2 is 97%~103% of the first direct-current power source Vdc1. Namely, the second error range Re2 is the best that an upper limitation of the second error range Re2 is the first direct-current power source Vdc1 plus 3% of the first direct-current power source Vdc1 and a lower limitation of the second error range Re2 is the first direct-current power source Vdc1 minus 3% of the first direct-current power source Vdc1. The alternating-current-to-direct-current conversion unit 10 actively controls and provides the first direct-current power source Vdc1 to the inverter unit 20 on the back-end, wherein the first direct-current power source Vdc1 is stable and is not influenced by the voltage value (or the power variation) of the alternating-current input power source Viac. The alternating-current-to-direct-current conversion unit 10 further has the function of the power factor correction for the alternating-current input. Finally, the inverter unit 20 obtains the first direct-current power source Vdc1 to drive the motor to drive the fan blades. The inverter unit 20 receives control commands from the control unit 30 to adjust the rotational speed of the fan 40. Therefore, the motor can avoid the problem that the rotational speed of the motor cannot reach the predetermined rotational speed because the variation of the voltage value (or the power variation) of the alternating-current input power source Viac is too large. The first direct-current power source Vdc1 is maintained at the voltage which is pre-set by the original motor design that has the peak efficiency, so that the motor steadily works in the high efficiency area and is not influenced by the alternating-current input power source Viac. Therefore, when the power variation of the alternating-current input power source Viac changes, the rotational speed of the fan 40 can be maintained within the first error range Re1. The best is that the first error range Re1 is 97%~103% of the rotational speed of the fan 40. Namely, the first error range Re1 is the best that an upper limitation of the first error range Re1 is the rotational speed of the fan 40 plus 3% of the rotational speed of the fan 40 and a lower limitation of the first error range Re1 is the rotational speed of the fan 40 minus 3% of the rotational speed of the fan 40.

Figure 5:
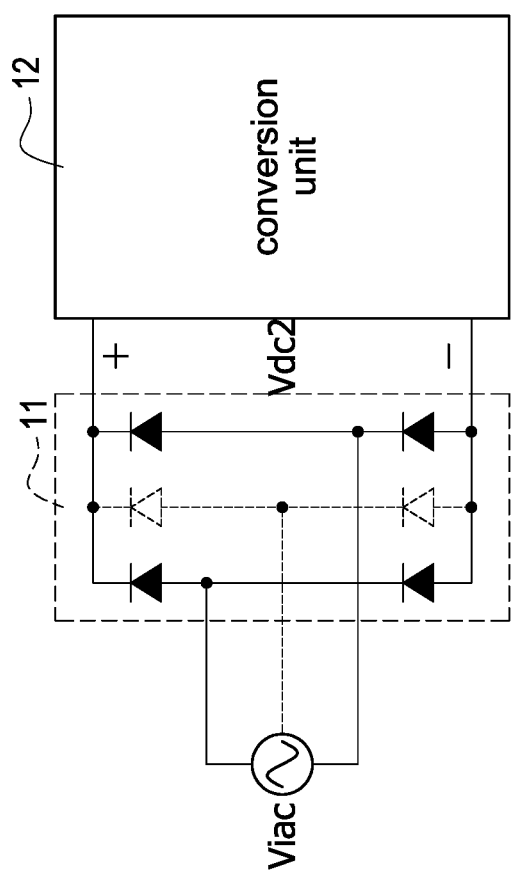
FIG. 5 shows a phase application diagram of the alternating-current input power source of the present invention.

FIG. 5 shows a phase application diagram of the alternating-current input power source of the present invention. Please refer to FIG. 3A again. Besides that the present invention can be applied to the three-phase 220V~480V power sources, the rectifying unit 11 with the three-phase bridge type obtains any two phases powers as the single-phase alternating-current input power source Viac, and just like the related art single-phase bridge rectifier, the rectifying unit 11 fully-wave rectifies the alternating-current input power source Viac to output the second direct-current power source Vdc2. Therefore, no circuit modification is required. When the single-phase alternating-current input power source Viac is received, just like the three-phase alternating-current input power source Viac, the rectifying unit 11 rectifies the single-phase alternating-current input power source Viac to output the second direct-current power source Vdc2. The second direct-current power source Vdc2 is provided to the conversion unit 12, and then the conversion unit 12 converts the second direct-current power source Vdc2 into the first direct-current power source Vdc1 which is required by the inverter unit 20 on the back-end. Therefore, the circuit structures of the present invention not only can be applied to the three-phase alternating-current input power source, but also can be compatible with the application of the single-phase alternating-current input power source directly.

Figure 6:
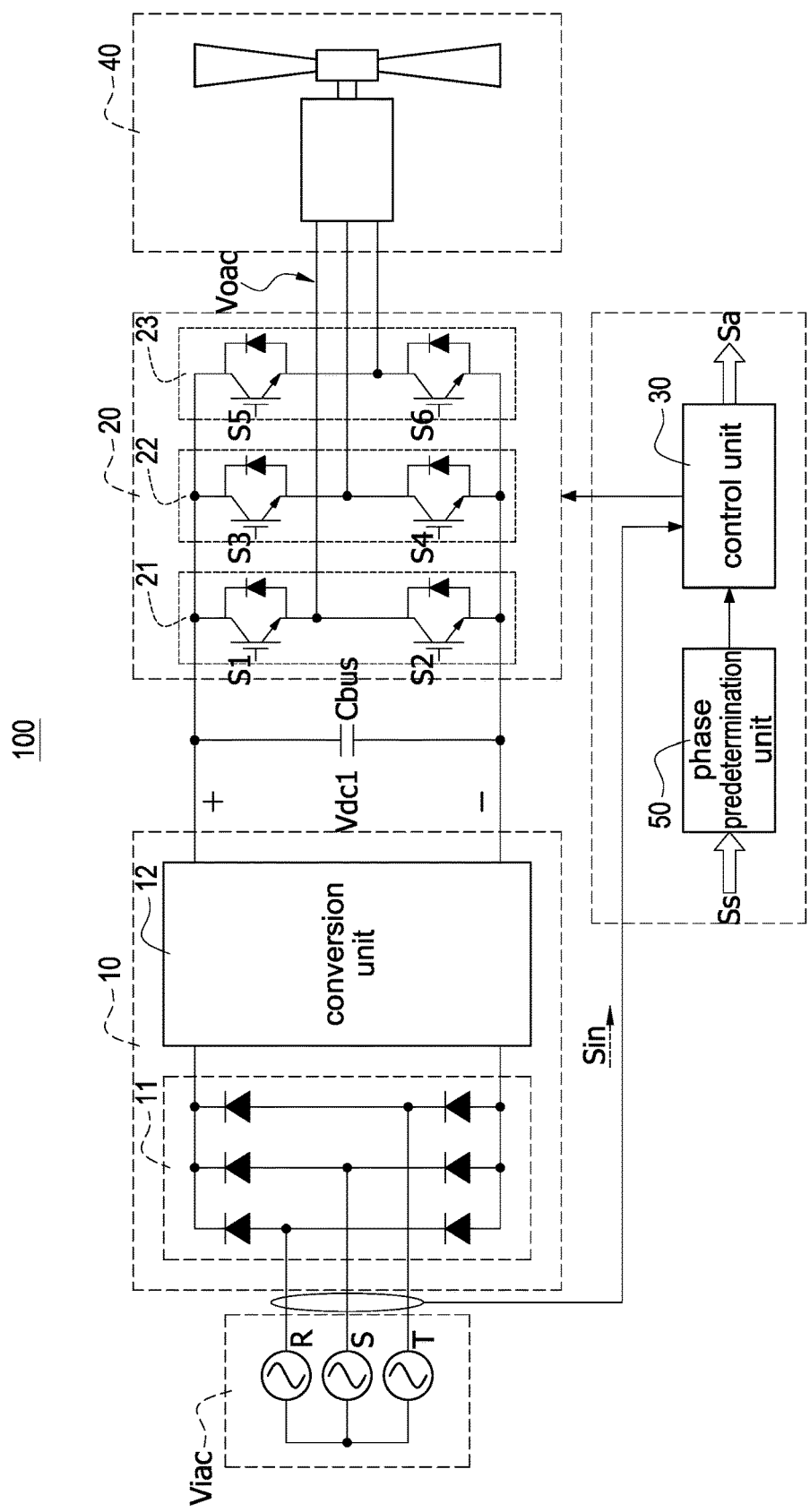
FIG. 6 shows a circuit block diagram of the electronically commutated fan system applied to the phase predetermination unit of the present invention.

FIG. 6 shows a circuit block diagram of the electronically commutated fan system applied to the phase predetermination unit of the present invention. The electronically commutated fan system 100 can receive the single-phase or three-phase alternating-current input power source Viac. However, if the three-phase alternating-current input power source Viac is out-phase, the three-phase alternating-current input power source Viac forms (namely, becomes) the single-phase alternating-current input power source Viac, so that when the three-phase alternating-current input power source Viac is out-phase, the features of the three-phase alternating-current input power source Viac is the same with the features of the single-phase alternating-current input power source Viac. Therefore, the electronically commutated fan system 100 cannot identify (namely, cannot verify) whether the current state is three-phase-but-out-phase or single-phase, so that an alarm signal Sa which is used to alarm that the three-phase power is out-phase cannot be sent out to alarm that the three-phase power is abnormal. Therefore, the electronically commutated fan system 100 further comprises a phase predetermination unit 50 electrically connected to the control unit 30. The control unit 30 detects an input signal Sin of the alternating-current input power source Viac. The control unit 30 verifies whether there is the input voltage on the three paths of the alternating-current input power source Viac or not by detecting the input signal Sin. The user sends a phase selection signal Ss to the phase predetermination unit 50 to select the input power type that the user expects. Then, the control unit 30 compares the input signal Sin with the phase selection signal Ss to verify whether the alternating-current input power source Viac is three-phase-but-out-phase or single-phase. According to the two functions mentioned above, when the power type is selected as the three-phase alternating-current input power source Viac, if the control unit 30 interprets (namely, verifies or identifies) that the input signal Sin is single-phase, the control unit 30 starts an out-phase mechanism to output the alarm signal Sa. If the power type is selected (namely, set) as the single-phase alternating-current input power source Viac, when the control unit 30 interprets (namely, verifies or identifies) that the input signal Sin is single-phase, because the power type selected (namely, set) by the phase predetermination unit 50 is the single-phase alternating-current input power source Viac, the control unit 30 does not start the out-phase mechanism and does not output the alarm signal Sa. According to the description mentioned above, the electronically commutated fan system 100 can accurately determine (namely, verify or identify) whether the input power is three-phase-but-out-phase or single-phase by the function of selecting the power type. Moreover, the alarm signal Sa is used to inform or alarm that the alternating-current input power source Viac is abnormal. Therefore, in this embodiment, the expression of the alarm signal Sa is not limited. For example but not limited to, the alarm signal Sa is a sound-light type alarm signal or a display type alarm signal. Moreover, the selecting power type function of the phase predetermination unit 50 can be achieved by the voltage or current electrical signal difference set by the user, so that the phase predetermination unit 50 determines different input power type. The selecting power type function of the phase predetermination unit 50 can be achieved by the contacts change (on/off) of the mechanical contacts (for example, the relay, jumper etc.) as well.

In conclusion, the present invention comprises following advantages:

1. A single three-phase electronically commutated fan system can be applied to the voltage range of wide input power. Because the input of the electronically commutated fan system 100 can be three-phase or single-phase and the voltage variation range is 220V~480V, the electronically commutated fan system 100 can be compatible with most input voltages, so that the efficiency of providing the flexibility of the power application for the cooling system or module design can be achieved.

2. The rotational speed of the electronically commutated fan system is not changed by the variation of the alternating-current input power source Viac. The alternating-current-to-direct-current conversion unit 10 stabilizes the first direct-current power source Vdc1 of the bus capacitor Cbus, so that the inverter unit 20 does not exceed the range of stably adjusting the rotational speed by adjusting the duty cycle, wherein the inverter unit 20 will exceed the range of stably adjusting the rotational speed by adjusting the duty cycle because the variation of the alternating-current input power source Viac is too large. Therefore, the effect of stabilizing the rotational speed of the fan 40 and the efficiency can be achieved.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An electronically commutated fan system comprising:
    an alternating-current-to-direct-current conversion unit receiving an alternating-current input power source and converting the alternating-current input power source into a first direct-current power source, wherein the alternating-current input power source is a three-phase alternating-current power source or a single-phase alternating-current power source;
    an inverter unit electrically connected between the alternating-current-to-direct-current conversion unit and a fan, the inverter unit converting the first direct-current power source into an alternating-current output power source and providing the alternating-current output power source to the fan to rotate;
    a control unit electrically connected to the alternating-current-to-direct-current conversion unit and the inverter unit, the control unit controlling the alternating-current-to-direct-current conversion unit and the inverter unit to adjust a rotational speed of the fan; and
    a phase predetermination unit electrically connected to the control unit, the phase predetermination unit predetermining the alternating-current input power source to the three-phase alternating-current power source or the single-phase alternating-current power source according to a phase selection signal received by the phase predetermination unit,
    wherein
        when the control unit detects a power variation of the alternating-current input power source, the control unit controls the rotational speed of the fan to be maintained within a first error range, and
        when the phase predetermination unit predetermines that the alternating-current input power source is the three-phase alternating-current power source, and the control unit detects that the alternating-current input power source is single-phase, an alarm signal is generated.

2. The electronically commutated fan system in claim 1 further comprising:
    a bus capacitor electrically connected between the alternating-current-to-direct-current conversion unit and the inverter unit, the bus capacitor storing and stabilizing the first direct-current power source,
    wherein a voltage crossing the bus capacitor is the first direct-current power source; when the control unit detects the power variation of the alternating-current input power source, the first direct-current power source outputted from the alternating-current-to-direct-current conversion unit is controlled and maintained within a second error range, so that the rotational speed of the fan is maintained within the first error range.

3. The electronically commutated fan system in claim 2, wherein a range of the power variation of the alternating-current input power source is between 220 volts and 480 volts; when the range of the power variation of the alternating-current input power source is between 220 volts and 480 volts, the second error range is 97%~103% of the first direct-current power source and the first error range is 97%~103% of the rotational speed of the fan.

4. The electronically commutated fan system in claim 1, wherein the alternating-current-to-direct-current conversion unit is an active type power factor corrector.

5. The electronically commutated fan system in claim 1, wherein the alternating-current-to-direct-current conversion unit comprises:
    an inductor group receiving the alternating-current input power source;
    a rectifying unit electrically connected to the inductor group;
    a switch unit connected to the rectifying unit in parallel; and
    a diode electrically connected between the switch unit and the inverter unit,
    wherein the alternating-current-to-direct-current conversion unit converts the alternating-current input power source into the first direct-current power source.

6. The electronically commutated fan system in claim 1, wherein if a peak voltage of the alternating-current input power source is lower than a voltage of the first direct-current power source, the alternating-current-to-direct-current conversion unit is a boost alternating-current-to-direct-current converter; if the peak voltage of the alternating-current input power source is higher than the voltage of the first direct-current power source, the alternating-current-to-direct-current conversion unit is a buck alternating-current-to-direct-current converter.

7. The electronically commutated fan system in claim 1, wherein the control unit comprises a controller; the controller controls the alternating-current-to-direct-current conversion unit and the inverter unit simultaneously.

8. The electronically commutated fan system in claim 1, wherein the phase predetermination unit is mechanical-connection-predetermining or electrical-signal-difference-predetermining.

9. The electronically commutated fan system in claim 2, wherein the alternating-current-to-direct-current conversion unit comprises:
    a rectifying unit receiving the alternating-current input power source and rectifying the alternating-current input power source to obtain a second direct-current power source; and
    a conversion unit electrically connected between the rectifying unit and the inverter unit, the conversion unit converting the second direct-current power source into the first direct-current power source.

10. The electronically commutated fan system in claim 9, wherein the conversion unit is a boost converter; the conversion unit comprises an inductor, a switch unit and a diode; one side of the inductor is electrically connected to the rectifying unit; the other side of the inductor is connected to one side of the switch unit and an anode of the diode; a cathode of the diode is connected to one side of the bus capacitor; the control unit controls an on-off status of the switch unit to stabilize the first direct-current power source of the bus capacitor.

11. The electronically commutated fan system in claim 9, wherein the conversion unit is a buck converter; the conversion unit comprises an inductor, a switch unit and a diode; one side of the switch unit is electrically connected to the rectifying unit; the other side of the switch unit is connected to one side of the inductor and a cathode of the diode; the other side of the inductor is connected to one side of the bus capacitor; the control unit controls an on-off status of the switch unit to stabilize the first direct-current power source of the bus capacitor.

12. An electronically commutated fan system comprising:
an alternating-current-to-direct-current conversion unit receiving an alternating-current input power source and converting the alternating-current input power source into a first direct-current power source, wherein the alternating-current input power source is a three-phase alternating-current power source or a single-phase alternating-current power source;
an inverter unit electrically connected between the alternating-current-to-direct-current conversion unit and a fan, the inverter unit converting the first direct-current power source into an alternating-current output power source and providing the alternating-current output power source to the fan to rotate;
a control unit comprising two controllers electrically connected to the alternating-current-to-direct-current conversion unit and the inverter unit respectively, the two controllers controlling the alternating-current-to-direct-current conversion unit and the inverter unit respectively to adjust a rotational speed of the fan; and
a phase predetermination unit electrically connected to the control unit, the phase predetermination unit predetermining the alternating-current input power source to the three-phase alternating-current power source or the single-phase alternating-current power source according to a phase selection signal received by the phase predetermination unit,
wherein
when the control unit detects a power variation of the alternating-current input power source, the control unit controls the rotational speed of the fan to be maintained within a first error range, and
when the phase predetermination unit predetermines that the alternating-current input power source is the three-phase alternating-current power source, and the control unit detects that the alternating-current input power source is single-phase, an alarm signal is generated.

13. The electronically commutated fan system in claim 12 further comprising:
a bus capacitor electrically connected between the alternating-current-to-direct-current conversion unit and the inverter unit, the bus capacitor storing and stabilizing the first direct-current power source,
wherein a voltage crossing the bus capacitor is the first direct-current power source; when the control unit detects the power variation of the alternating-current input power source, the first direct-current power source outputted from the alternating-current-to-direct-current conversion unit is controlled and maintained within a second error range, so that the rotational speed of the fan is maintained within the first error range.

14. The electronically commutated fan system in claim 13, wherein a range of the power variation of the alternating-current input power source is between 220 volts and 480 volts; when the range of the power variation of the alternating-current input power source is between 220 volts and 480 volts, the second error range is 97%~103% of the first direct-current power source and the first error range is 97%~103% of the rotational speed of the fan.

* * * * *